United States Patent
Urs et al.

(10) Patent No.: US 6,529,488 B1
(45) Date of Patent: Mar. 4, 2003

(54) MULTIPLE FREQUENCY ALLOCATION RADIO FREQUENCY DEVICE AND METHOD

(75) Inventors: Kamala Urs, Bartlett, IL (US); Israel A. Cimet, Chandler, AZ (US); Michael Kotzin, Buffalo Grove, IL (US); Valy Lev, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/339,413

(22) Filed: Jun. 24, 1999

Related U.S. Application Data
(60) Provisional application No. 60/096,962, filed on Aug. 18, 1998.

(51) Int. Cl.[7] .............................. H04J 3/00; H04Q 7/20
(52) U.S. Cl. ................ 370/330; 370/478; 370/343; 370/336; 370/345; 370/498; 455/450
(58) Field of Search ..................... 370/330, 344, 370/478, 481, 313, 314, 328, 329, 336, 337, 343, 345, 347, 498; 455/452, 450, 451

(56) References Cited

U.S. PATENT DOCUMENTS

| | | | |
|---|---|---|---|
| 5,208,804 A | 5/1993 | Wilson et al. | 370/343 |
| 5,228,025 A | 7/1993 | Le Floch et al. | 370/206 |
| 5,257,398 A | 10/1993 | Schaeffer | 455/452 |
| 5,430,716 A * | 7/1995 | Pawelski | 370/388 |
| 5,608,724 A | 3/1997 | Green, Jr. | 370/307 |
| 5,809,030 A | 9/1998 | Mestdagh et al. | 370/480 |
| 5,999,818 A * | 12/1999 | Gilbert et al. | 370/330 |
| 6,023,621 A * | 2/2000 | Jackson et al. | 370/330 |

* cited by examiner

*Primary Examiner*—Lee Nguyen
*Assistant Examiner*—Rafael Perez-Gutierrez
(74) *Attorney, Agent, or Firm*—Susan S. Lukasik; Jeffrey K. Jacobs (57) ABSTRACT

A method of the present invention includes the steps of identifying (801) a first frequency allocation and a second frequency allocation and programming a radio frequency device (401, 701, 901) to at least one of: a) simultaneously receive a first signal within the first frequency allocation and a second signal within the second frequency allocation; and b) simultaneously transmit a first signal within the first frequency allocation and a second signal within the second frequency allocation.

36 Claims, 6 Drawing Sheets

MULTIPLE FREQUENCY ALLOCATION RADIO FREQUENCY DEVICE AND METHOD

REFERENCES(S) TO RELATED APPLICATION(S)

The present application claims priority from provisional application, Ser. No. 60/098,962, entitled "MULTIPLE FREQUENCY ALLOCATION RADIO FREQUENCY DEVICE AND METHOD," filed Aug. 18, 1998, which is commonly owned and incorporated herein by reference in its entirety.

FIELD OF THE INVENTION

This invention relates to communication systems, including but not limited to transmitters and receivers in radio frequency communication systems.

BACKGROUND OF THE INVENTION

The basic operation and structure of a land mobile radio system is well known. Land mobile radio systems typically comprise one or more radio communication units, such as mobile and portable radios, and one or more repeaters, base stations, or base radios, that transceive information via radio frequency (RF) communication resources. These communication resources may be narrowband frequency modulated channels, TDMA (time division multiple access) slots, carrier frequencies, frequency pairs, FDM (Frequency Division Multiplexed) resources, and other RF transmission media. Land mobile radio systems may be organized as trunked communication systems, where a plurality of communication resources is allocated amongst a group of users by assigning the repeaters on a communication-by-communication basis within an RF coverage area.

Figure 1:
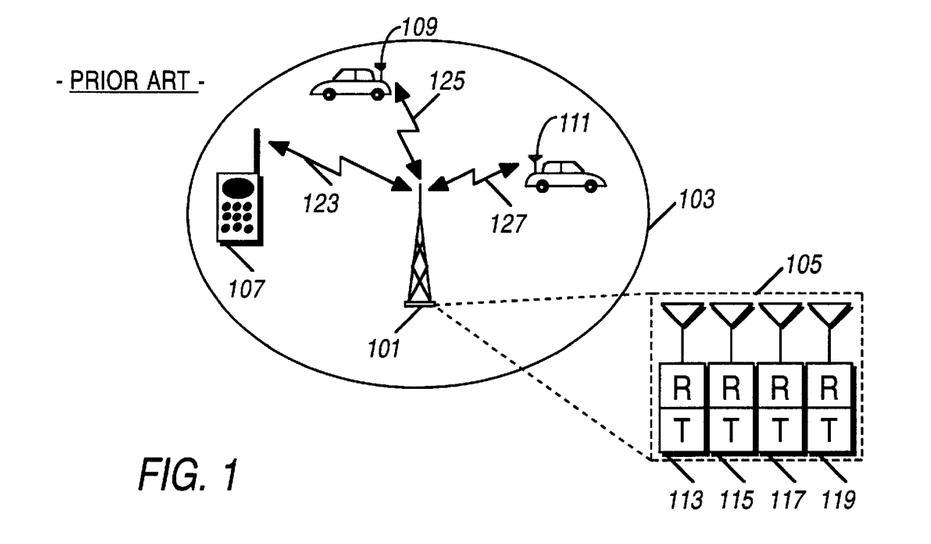
FIG. 1 is a block diagram of a communication system as is known in the art.

A block diagram of an example communication system a known in the art is shown in FIG. 1. A communication site 101 services a coverage area 103 using a plurality of base stations, repeaters, and/or base radios 105. For the sake of simplicity, the term BRs (base radios) will be used to refer to base stations, repeaters, and/or base radios throughout this specification and claims. Within this coverage area are three communication units, a portable radio 107, and two mobile radios 109 and 111. Each of these communication units 107, 109, and 111 is presently engaged in a different call with the base site 101. The first communication unit 107 is engaged on communication channel 123 that is sourced by a first BR 113. The first mobile communication unit 109 is engaged in a call on a communication resource 125 that is sourced by a second BR 115, and the second mobile communication unit 111 is engaged in a conversation on yet another communication channel 127 that is sourced by a third BR 117 (or BR 119, e.g.).

Figure 2:
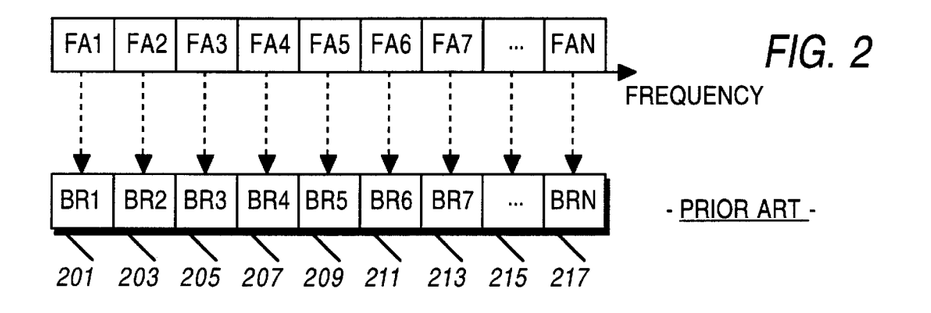
FIG. 2 is a diagram showing frequency allocation to BR assignment as is known in the art.

As is known in the art, each frequency allocation, such as a TDMA slot, frequency pair, carrier frequency, FDM resource, and so forth, is given a fixed frequency band in which to operate. In today's systems, a different BR is used to service each frequency allocation during a specific time. For example, as shown in FIG. 2, frequency allocation 1 (FA1) is serviced by BR 201 (BR1), frequency allocation 2 is sourced by BR 203 (BR2), and frequency allocations 3 through N are sourced by BRs 205, 207, 209, 211, 213, 215, and 217 (BR3 through BRN), respectively.

Presently, there is a desire to service many more communication units with a single system that covers larger geographic areas and have many different communication resources available at each site. As a consequence, more and more BRs are necessary for each system. In today's systems, a BR is placed at each site for each different communication resource provided at the site. Hence, if there are fifteen different channels at a site, there will be fifteen different BRs at the site. For example, in a multiple site system, where there are fifteen communication resources at each of 10 sites, 150 BRs are necessary. In addition, some systems require back-up BRs to be present in case of an emergency, to ensure communications capability whenever possible. Each site is thus likely to have additional standby BRs in case of emergency. As a result, communication systems requiring so many BRs may be extremely expensive.

Accordingly, there is a need for a less expensive communication system that still provides the same amount of communication throughput over the same coverage area.

DESCRIPTION OF A PREFERRED EMBODIMENT

The following describes a method of and apparatus for a single radio frequency device, such as a BR, portable radio, mobile radio, receiver, transmitter, transceiver, or scanner, to simultaneously transmit and/or receive multiple different communication resources, sourced or received by different devices. Multiple frequency allocations are combined in a single radio frequency device that receives and/or transmits on all of the frequency allocations simultaneously via FDM or via TDM in the entire frequency spectrum covered by all of the frequency allocations.

A radio frequency communication device in accord with the present invention comprises a receiver and a demodulator disposed within the receiver, the demodulator arranged and constructed to receive, using a single demodulation path, a communication signal modulated within N adjacent frequency allocations, wherein N is an integer greater than or equal to two. When N is greater than or equal to two, the communication signal may be comprised of a first signal and a second signal, wherein the first signal is sourced by a first transmitter and the second signal is sourced by a second transmitter, and the first transmitter is not the second transmitter. The communication signal may be sourced by more than two transmitters. The receiver may be used in a communication system comprising K contiguous frequency allocations, wherein K is an integer greater than or equal to two, wherein N is less than or equal to K, and the N adjacent frequency allocations comprises any N adjacent frequency allocations of the K contiguous frequency allocations. The communication signal may be comprised of at least two time division multiplexed signals. The receiver may be used in a communication system comprising a first set of contiguous frequency allocations and a second set of contiguous frequency allocations, wherein the first set and the second set are not adjacent. The receiver may be used in a communication system comprising K contiguous frequency allocations, and the communication signal may occupy a time slot of length X, wherein K is an integer greater than or equal to two and X is a time period. The demodulator may have at least two modes of operation, wherein: i) in a first mode of operation, the demodulator demodulates N signals, wherein each of the N signals occupies a different one of N adjacent frequency allocations from among K contiguous frequency allocations; and ii) in a second mode of operation, the demodulator demodulates a signal occupying a time slot of length X and M adjacent frequency allocations from among L contiguous frequency allocations; wherein X is a time period and K, L, and M are each an integer greater than or equal to two.

A radio frequency communication device in accord with the present invention comprises a transmitter and a modulator disposed within the transmitter, the modulator arranged and constructed to transmit, using a single modulation path, a communication signal modulated within N adjacent frequency allocations, wherein N is an integer greater than or equal to two. The communication signal may be comprised of N signals each occupying a time slot of length X. The transmitter may be used in a communication system comprising K contiguous frequency allocations, wherein K is an integer greater than or equal to two, wherein N is less than or equal to K, and the N adjacent frequency allocations comprises any N adjacent frequency allocations of the K contiguous frequency allocations. The communication signal may be comprised of at least two time division multiplexed signals. The transmitter may be used in a communication system comprising a first set of contiguous frequency allocations and a second set of contiguous frequency allocations, wherein the first set and the second set are not adjacent. The transmitter may be used in a communication system comprising K contiguous frequency allocations and the communication signal occupies a time slot of length X, wherein K is an integer greater than or equal to two and X is a time period. The modulator may have at least two modes of operation, wherein: i) in a first mode of operation, the modulator transmits N signals, wherein each of the N signals occupies a different one of N adjacent frequency allocations from among K contiguous frequency allocations; and ii) in a second mode of operation, the modulator modulates a signal occupying a time slot of length X and M adjacent frequency allocations from among L contiguous frequency allocations; wherein X is a time period and K, L, and M are each an integer greater than or equal to two.

In a radio frequency communication system having a predetermined number of communication resources and providing communications to a plurality of communication units, a method of the present invention comprises the steps of: receiving, by a radio frequency communication device, a list of two or more adjacent communication resources, wherein the two or more adjacent communication resources have a composite frequency range comprising the at least two or more adjacent communication resources and having a first frequency at the lowest frequency in the composite frequency range and a last frequency at the highest frequency in the composite frequency range; receiving a radio frequency signal substantially within the composite frequency range; and demodulating, using a single demodulation path, the received radio frequency signal beginning with the first frequency and ending with the last frequency. The method may further comprise the steps of: receiving, by a radio frequency communication device, a list of at least two adjacent communication resources, wherein the list of at least two adjacent communication resources has a new composite frequency range comprising the at least two adjacent communication resources and having a new first frequency at the lowest frequency in the new composite frequency range and a new last frequency at the highest frequency in the new composite frequency range; receiving a new radio frequency signal substantially within the new composite frequency range; and demodulating, using the single demodulation path, the new received radio frequency signal beginning with the new first frequency and ending with the new last frequency. The radio frequency signal may be comprised of a first signal and a second signal, wherein the first signal is sourced by a first transmitter and the second signal is sourced by a second transmitter, and wherein the first transmitter is not the second transmitter. The demodulator may use frequency division multiplexing or time division multiplexing. The radio frequency communication system may comprise a first set of contiguous frequency allocations and a second set of contiguous frequency allocations, wherein the first set and the second set are not adjacent.

In a radio frequency communication system having a predetermined number of communication resources and providing communications to a plurality of communication units, a method of the present invention comprises the steps of: receiving, by a radio frequency communication device, a list of two or more adjacent communication resources, wherein the two or more adjacent communication resources have a composite frequency range comprising the at least two or more adjacent communication resources and having a first frequency at the lowest frequency in the composite frequency range and a last frequency at the highest frequency in the composite frequency range; modulating, using a single modulation path, a signal beginning with the first frequency and ending with the last frequency, yielding a radio frequency signal; and transmitting the radio frequency signal substantially within the composite frequency range. The method may further comprise the steps of: receiving, by a radio frequency communication device, a list of at least two adjacent communication resources, wherein the list of at least two adjacent communication resources has a new composite frequency range comprising the at least two adjacent communication resources and having a new first frequency at the lowest frequency in the new composite frequency range and a new last frequency at the highest frequency in the new composite frequency range;

modulating, using the single modulation path, a new signal beginning with the new first frequency and ending with the new last frequency, yielding a new radio frequency signal; and transmitting the new radio frequency signal substantially within the new composite frequency range. The radio frequency signal may be comprised of a first signal and a second signal, wherein the first signal is received by a first receiver and the second signal is received by a second receiver, and wherein the first receiver is not the second receiver. The modulator may use frequency division multiplexing or time division multiplexing. The radio frequency communication system may comprise a first set of contiguous frequency allocations and a second set of contiguous frequency allocations, wherein the first set and the second set are not adjacent.

A method of the present invention comprises the steps of identifying a first frequency allocation and a second frequency allocation; determining whether a first signal is to occupy the first frequency allocation and a second signal is to occupy the second frequency allocation or a third signal is to occupy both the first frequency allocation and the second frequency allocation; and when the first signal is to occupy the first frequency allocation and the second signal is to occupy the second frequency allocation, programming a radio frequency device to receive and/or transmit the first signal within the first frequency allocation and the second signal within the second frequency allocation. The method may further comprise the steps of identifying a third frequency allocation and programming the radio frequency device to at least one of: a) simultaneously receive the first signal within the first frequency allocation, the second signal within the second frequency allocation, and a fourth signal within the third frequency allocation; and b) simultaneously transmit the first signal within the first frequency allocation, the second signal within the second frequency allocation, and a fourth signal within the third frequency allocation. The method may further comprise the step of when the third signal is to occupy both the first frequency allocation and the second frequency allocation, programming the radio frequency device to receive and/or transmit the third signal simultaneously occupying both the first frequency allocation and the second frequency allocation. The method may further comprise the steps of identifying a third frequency allocation and programming the radio frequency device to receive and/or transmit a fourth signal simultaneously occupying the first frequency allocation, the second frequency allocation, and the third frequency allocation.

Another method of the present invention comprises the steps of identifying a plurality of frequency allocations; allotting two or more of the plurality of frequency allocations to each of one or more frequency blocks, such that each of the one or more frequency blocks is comprised of two or more adjacent frequency allocations; assigning at least one base radio to each of the one or more frequency blocks; and selecting a modulation scheme for use by each of the assigned base radios. The method may further comprise the step of adding one of the plurality of frequency allocations to a first frequency block of the one or more frequency blocks, wherein the added one of the plurality of frequency allocations is adjacent to one of the two or more of the plurality of frequency allocations allotted to the first frequency block. The method may further comprise the step of removing one of the plurality of frequency allocations from a first frequency block of the one or more frequency blocks, wherein the remaining frequency allocations allotted to the first frequency block are adjacent. The method may further comprise the steps of reassigning at least one base radio to one of the one or more frequency blocks. The step of selecting may comprise the step of selecting a time division multiplexed modulation scheme for a first base radio, the method further comprising the step of sending a message, to a radio frequency communication unit, the message indicating that the time division multiplexed modulation scheme is assigned to the frequency block assigned to the first base radio. A different number of frequency allocations may be assigned to two or more base radios.

A radio frequency communication device comprising a radio frequency transmitter and a modulator operably coupled to the radio frequency transmitter, and having at least two modes of operation, wherein: i) in a first mode of operation, the modulator transmits a first signal within a first frequency allocation and simultaneously transmits a second signal within a second frequency allocation; and ii) in a second mode of operation, the modulator transmits a third signal simultaneously occupying both the first frequency allocation and the second frequency allocation. The modulator may have a third mode of operation wherein the modulator transmits a first signal within a first frequency allocation and simultaneously transmits a second signal within a second frequency allocation, and the modulator simultaneously transmits the third signal simultaneously occupying both a third frequency allocation and a fourth frequency allocation. The first signal and the second signal may be received by different receivers.

Figure 3:
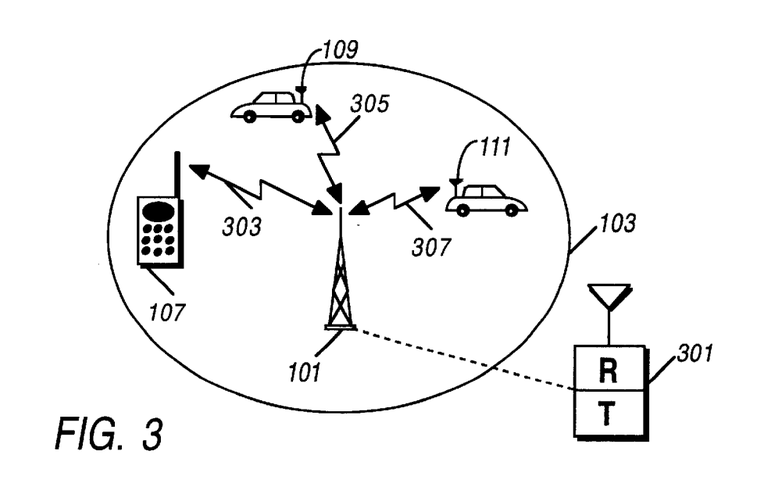
FIG. 3 is a block diagram of a communication system in accordance with the invention.

The block diagram of FIG. 3 shows a communication system in accordance with the invention. At base site 101, communication units 107, 109, and 111 are each engaged in a different call. The first communication unit 107 is engaged in a call on a first communication resource 303, the first mobile communication unit 109 is engaged in a call on a second communication resource 305, and the second mobile communication unit 111 is engaged in a call on a third communication resource 307. At the base site 101 resides a BR 301 that is capable of receiving and/or transmitting a signal from each of the communication units 107, 109, and 111 on each different frequency allocation 303, 305, and 307. In the preferred embodiment, each of the frequency allocations is simultaneously transmitted and/or received using an FDM type of multiplexing technique or using a TDM type of multiplexing technique, each different frequency allocation 303, 305, and 307 is transmitted and/or received while occupying the total spectrum that frequency allocations 303, 305, and 307 occupy, but only at ⅓ of the time for each communication resource.

Figure 4:
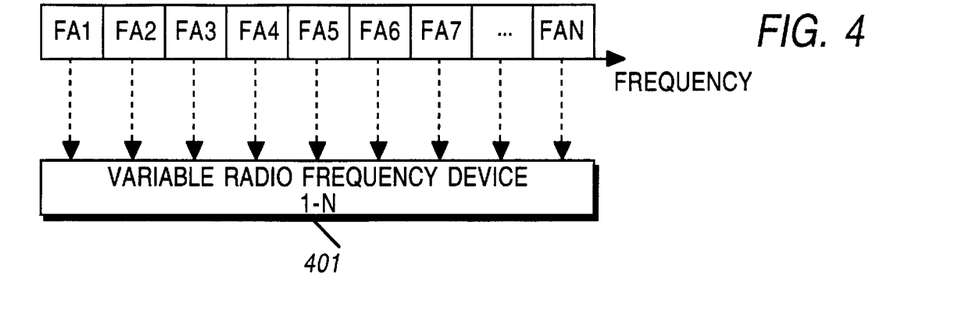
FIG. 4 and FIG. 5 are diagrams showing frequency allocation to BR assignment in accordance with the invention.

As shown in FIG. 4, a radio frequency device, such as a BR, portable adio, mobile radio, receiver, transmitter, transceiver, or scanner, uses a single-path approach to modulate and/or demodulate signals from each of the frequency allocations FA1-FAN in the same radio frequency device 401. Use of a single-path approach is not required, but is a novel approach to provide the advantages of the present invention. The radio frequency device 401, which will be referred to as a VRFD throughout, is thus able to simultaneously modulate or demodulate all N frequency allocations for which it is presently assigned. In one embodiment, the VRFD uses a single modulation path or a single demodulation path. In the preferred embodiment, each VRFD 401 is capable of modulating/demodulating signals using an FDM or a TDM approach, and may be dynamically programmed to perform either modulation technique. In the preferred embodiment, the VRFD, which is assigned to handle N adjacent frequency allocations, either modulates or demodulates the signal(s) only within the N adjacent frequency allocations and does not modulate or demodulate any signal (s) outside the N frequency allocations. Thus, the VRFD, when used as a BR (base station, repeater, or base radio), enables a cheaper device to be built because one VRFD may handle the number of signals that previously took two or more RF devices. When the VRFD 401 is programmed to provide TDM signal processing, the communication signal may be comprised of N signals each occupying a time slot of length X, where X is a time period. When the VRFD 401 is programmed to provide FDM signal processing, it may receive a different signal sourced by a different transmitter in each of the N frequency allocations, and may transmit a signal to a different receiver in each of the N frequency allocations. In this mode, the VRFD 401 is well-suited to a base station, repeater, or base radio function.

Figure 5:
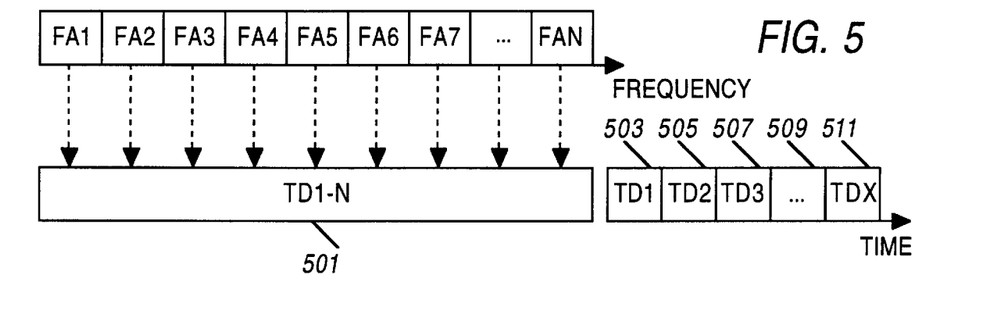

As shown in FIG. 5, the various frequency allocations are combined into TDM resources and handled as such by the VRFD 401. Each of the frequency allocations, which are contiguous in this case, are combined into one communication resource that is a time division multiplexed communication resource for users of all of the allocations that are combined. Here, N channels are combined. The N channel frequency allocation 501 is then time division multiplexed into X channels 503, 505, 507, 509, and 511, depending on how the system operator allocates the resource in time. In the preferred embodiment, N equals X, and N and X are both integers. In one embodiment, information for each channel, one through N, is received and compressed in time by the factor N to produce N independent signals. These N signals are then sequentially transmitted. It is understood that the compression operation expands the bandwidth by a factor N. This expansion is acceptable because the available transmission bandwidth is higher by the same factor N. When a TDM combination of frequency allocations is utilized, a large number of combinations of TDM communication resources, in both number of time slots and size of bandwidth, may be implemented, particularly if the receiving and transmitting units both have the capabilities of the present invention. Thus, a variable bandwidth radio frequency device results from application of the present invention. For example, if variable bandwidth receivers and transmitters are used in the same transmission, that particular transmission may, for example, select a 50 kHz channel in one transmission, but in another transmission, when more data, or more urgent need for transmitting data is necessary, a variable bandwidth radio may be programmed to handle 200 kHz channels, or even more depending upon the programming ability of the modulators and demodulators involved.

Figure 6:
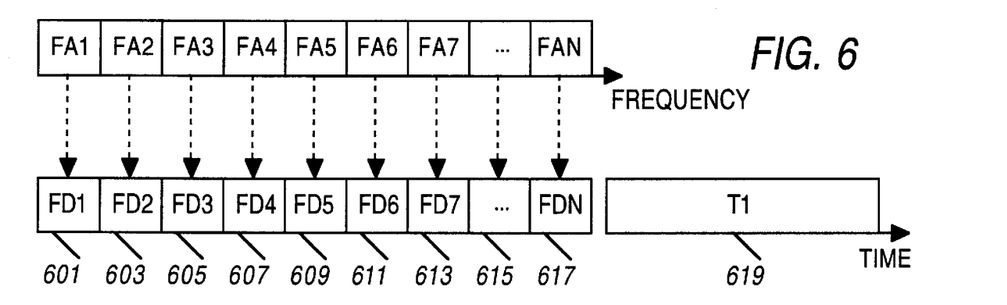
FIG. 6 and FIG. 7 are diagrams showing frequency allocation with respect to modulation/demodulation technique in accordance with the invention.

As shown in FIG. 6, the various frequency allocations are handled as FDM resources by the VRFD 401. The original signals are transmitted/received only within one of the frequency allocations, but the radio frequency device 401 partitions these signals as different FDM type channels, 601, 603, 605, 607, 609, 611, 613, 615, and 619. See FIG. 13, 14, and 15 and the associated text for details. Each of these channels occupies the entire time allocation 619 for transmission/reception. Such a technique is particularly useful when non-contiguous frequency allocations are desired to be handled by a single radio, such as the variable radio 501 of FIG. 5, or when a large number of communication units are in the field, and it is desired to continue to use such units with a BR comprising the radio frequency device 401 or 501. When an FDM type of frequency allocation combination is utilized, there is no need to modify communication units, such as receivers and/or transmitters, that are presently in use in a system, because a single radio frequency device can accommodate the same frequency allocations, only more frequency allocations may be handled at the same time by the same device.

In addition, the present invention may be applied to only some frequency allocations out of a total number of frequency allocations. For example, in FIG. 7, a VRFD 701 modulates or demodulates signals in frequency allocations 1, 2, 3, and 4. A second VRFD 703 modulates or demodulates signals in frequency allocations 6 and 7. A third VRFD 705 modulates or demodulates signals in frequency allocations N-2, N-1, and N. In this application of the present invention, all the frequency allocations need not be contiguous frequency allocations to gain benefit from the use of the present invention. A benefit of such an application includes the allocation of BRs at a base (communication) site 101 such that the total number of BRs is minimized. Take, for example, a system with nine frequency allocations, numbered 1, 2, 3, 4, 6, 7, 10, 11, and 12, that are found among twelve adjacent frequency allocations, numbered sequentially 1 through 12. In prior communication systems, such as shown and described with respect to FIG. 2, a BR is allocated for each frequency allocation, which would total nine BRs in the example. By applying the present invention, only three BRs in the form of VRFDs 701, 703, and 705 need be utilized, as is the case when N equals 12 in FIG. 7. Should a single frequency allocation have no adjacent frequency allocation assignable within the communication system, either a conventional frequency device that handles a single frequency allocation or a frequency device that handles a variable number of frequency allocations may be utilized.

Figure 7:
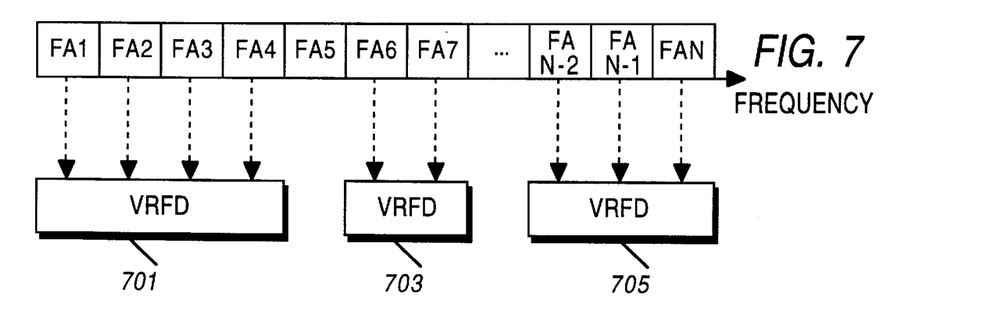

Using a frequency device that handles a variable number of frequency allocations provides more flexibility, because it may be reassigned to handle other frequency allocations at different times, or may be expanded should an adjacent frequency allocation become allotted to the system. A VRFD may be assigned to a large number of adjacent frequency allocations, wherever they may be found within the range of frequency allocations among which a communication system has its frequency allocations allotted. Phrased another way, when a communication system has J frequency allocations allotted among K contiguous frequency allocations, a VRFD may be allocated to handle any adjacent N frequency allocations of the K contiguous frequency allocations, where J and N are less than or equal to K, and J, K, and N are all integers. A communication system utilizing VRFDs will likely have a different number of frequency allocations assigned to two or more BRs, e.g., one BR may handle two frequency allocations where another may handle three frequency allocations. Further, different VRFDs in the same system may simultaneously utilize different modulation/demodulation schemes. For example, the VRFD 701 may be a TDM VRFD, and the other VRFDs 703 and 705 may be FDM VRFDs. Because of the versatility of a VRFD, the VRFD 701 may later be assigned to be a FDM VRFD, and the other VRFDs 703 and 705 may become TDM VRFDs. As more adjacent frequency allocations are assigned to a single BR, a less expensive total cost for BRs in a system results.

Figure 8:
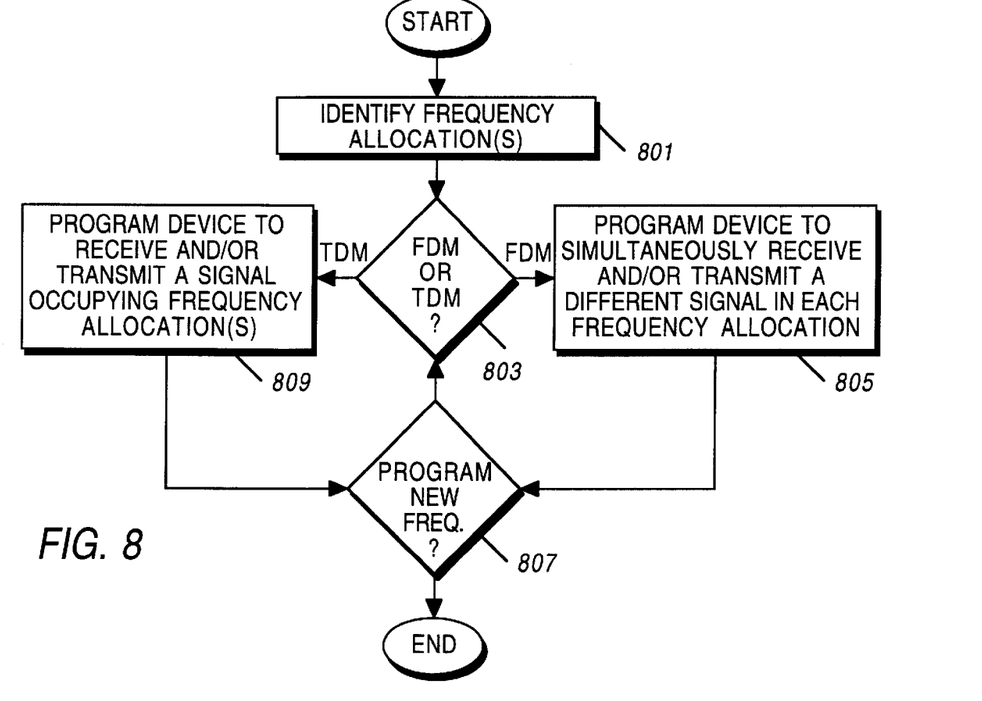
FIG. 8 is a flowchart showing a method of combining frequency allocations in a radio frequency device in accordance with the invention.

A method of combining frequency allocations in a radio frequency device is shown in the flowchart of FIG. 8. At step 801, one or more frequency applications are identified by examining the spectrum available for the communication system. The spectrum may comprise several blocks with gaps between them. The frequency allocations available at a site may be determined by the appropriate use of a cellular frequency reuse strategy. The adopted frequency reuse strategy is designed to maintain the desired frequency reuse pattern while maintaining desired capacity at each BR and maximizing the contiguous blocks at each BR. At step 803, it is determined if FDM or TDM, or any other type of multiplexing or combining technique such as CDMA, is the preferred technique for combining the frequency allocations identified at step 801. If a large number of communication units in the system are unable to support a TDM combining technique, perhaps because the units were put into service before the TDM approach was implemented, an FDM approach would be selected to provide communications to these communication units. Government regulations may require that a mask be used for each channel, even when the channels are adjacent, thus FDM would be a more reasonable choice. When a new system without any pre-existing communication units in service is planned, a TDM and/or FDM approach provides the most flexible options, including bandwidth requirements, for the communication system.

If FDM is to be utilized at step 803, the process continues with step 805, where the radio frequency device is programmed to simultaneously receive and/or transmit a different signal In each frequency allocation, as described above. The process continues with step 807, where if it is desired to program a different or additional frequency allocation into the radio frequency device, the different or additional frequency allocation is identified and the process continues with step 803, otherwise the process ends. If at step 803 a TDM type of combination is to be utilized, the radio frequency device is programmed (step 809) to receive and/or transmit a signal occupying the frequency allocation identified at step 801, and the process continues with step 807. By utilizing this method, a radio frequency device may be programmed on-the-fly to simultaneously handle a number of frequency allocations instead of only one. Such a device may vary in time to cover different frequencies, multiplexing techniques, and numbers of frequency allocations combined. As a result, a BR with the capabilities of the present invention may be capable of handling many communication resources instead of one. As a result, a system employing such a BR may need many fewer BRs. For example, a system not employing-the present invention having 15 communication resources at each of 10 sites requires 150 BRs plus any desired backups. The same system having 15 communication resources at each of 10 sites, where N equals 8 frequency allocations. per BR, requires only 20 BRs, and includes one back-up frequency allocation, which may be programmed in any way, per site.

Figure 9:
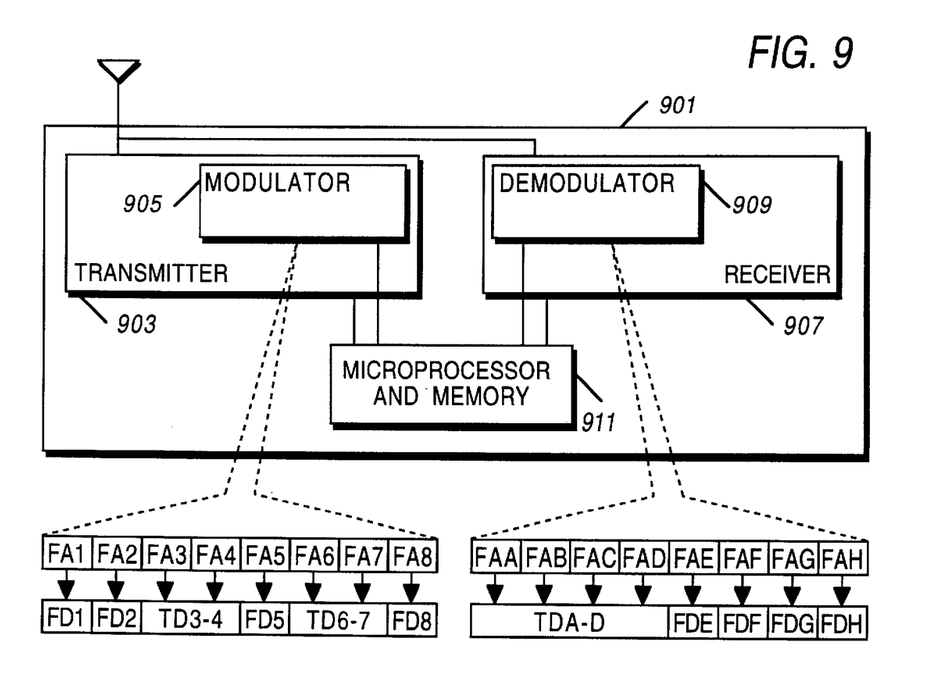
FIG. 9 is a block diagram of a radio frequency communication device in accordance with the invention.

A block diagram of a radio frequency device 901, which may be used in a base station, repeater, base radio, mobile, or portable, is shown in FIG. 9. The radio frequency device 901 comprises a transmitter 903, which comprises a modulator 905 as known in the art. The RF device 901 is also comprised of a receiver 907, which is comprised of a demodulator 909 as known in the art. A microprocessor, such as an MC 68000 available from Motorola, and memory 911 are operably coupled to the transmitter 903, modulator 905, receiver 907, and demodulator 909 to control the receiver and transmitter functionality and mode of operation.

An example of how the modulator 905 and demodulator may be assigned to various frequency allocations is also shown in FIG. 9. The modulator 905 operates on frequency allocations FA1 through FA8. In the example shown, FA1, FA2, FA5, and FA8, are handled using an FDM technique. Frequency allocations FA3 and FA4 are combined into a single TDM resource TD3-4, and frequency allocations FA6 and FA7 are combined into a single time division resource TD6-7, where each allocation receives half the time, but all of the bandwidth of TD3-4 or TD6-7. Similarly, the demodulator 909 is shown with its frequency allocation assignments for frequency allocations FAA through FAH. Frequency allocations FAA through FAD inclusive are combined into a single time division resource TDA-D, wherein each of the four channels receives in a time slot occupying one quarter of the time, but across the entire frequency spectrum covering FAA through FAD inclusive. Frequency allocations FAE through FAH are each handled as individual FDM resources FDE through FDH. Such allocations allow simplex connections or duplex connections that are not symmetrical in bandwidth, whereby one direction is receiving attention, in order to provide higher bandwidth access, such as to the internet, when more information is going to the subscriber than is coming from the subscriber. In the preferred embodiment, all contiguous frequency allocations would be allocated with the same combining technique (e.g., FDM or TDM), to make use of the savings cost provided by such an approach. The present invention may be applied to base stations, repeaters, base radios, portable radios, mobile radios, transceivers, transmitters, receivers, scanners, and other types of radio frequency devices.

Figures 10, 11, 12:
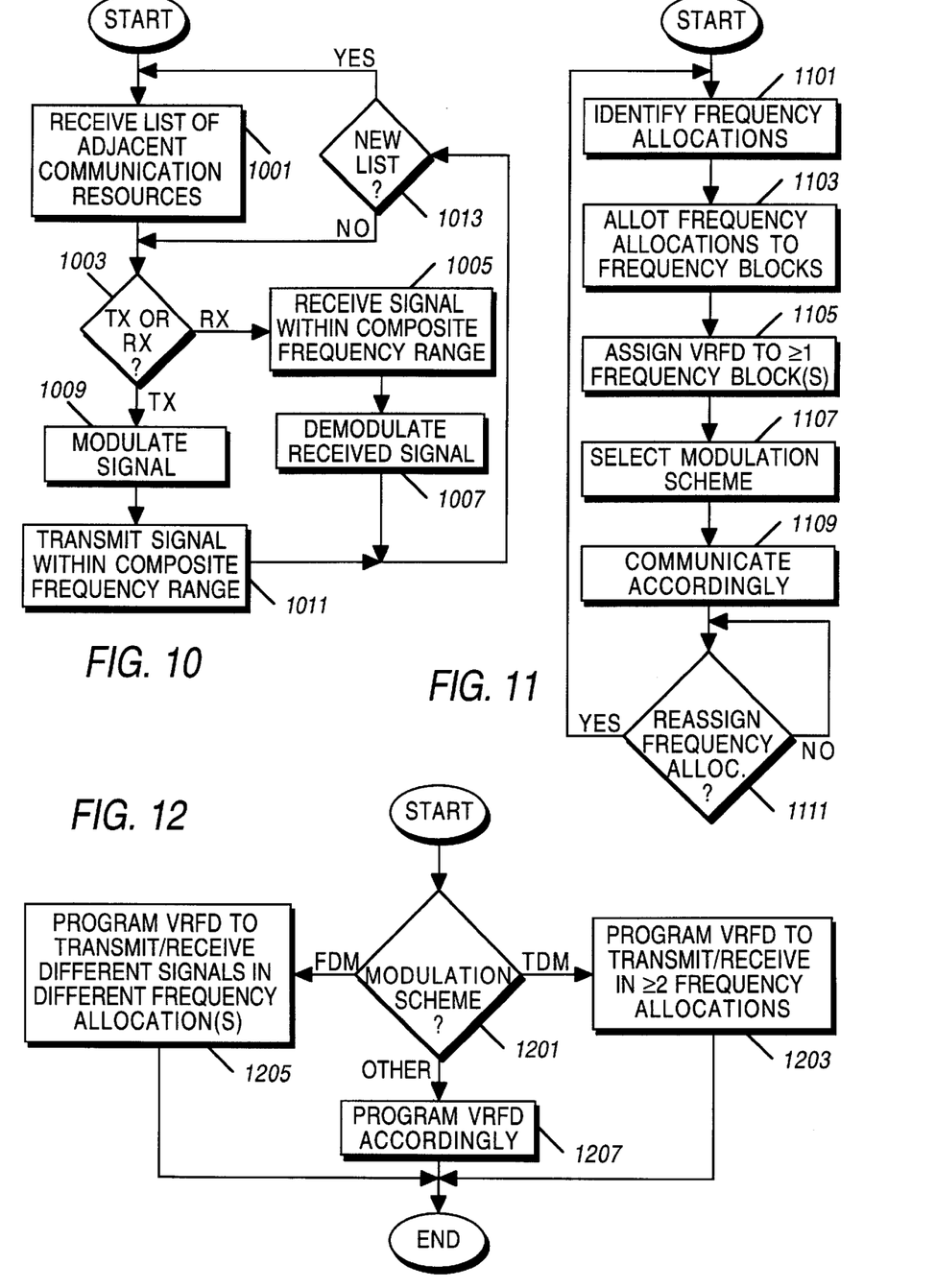
FIG. 10 is a flowchart showing a method of modulating/demodulating signals within a composite frequency range in accordance with the invention.
FIG. 11 is a flowchart showing a method of allotting frequency allocations to frequency blocks in accordance with the invention.
FIG. 12 is a flowchart showing a method of selecting and programming a modulation scheme in accordance with the invention.

A method of modulating/demodulating signals within a composite frequency range is shown in the flowchart of FIG. 10. At step 1001, a VRFD 401 receives a list of adjacent communication resources. The adjacent communication resources have a composite frequency range comprising at least two or more adjacent communication resources having the first frequency at the lowest frequency in the composite frequency range and a last frequency at the highest frequency in the composite frequency range. The list of adjacent communication resources may include two or more adjacent communication resources within the composite frequency range. The composite frequency range may be put together or compiled by a system engineer or system planner optionally using a frequency planning tool. The frequency planning tool would be modified from a readily available tool to include the ability to account for the composite frequency ranges provided by the present invention. The list would then be programmed into the communication system, for example at an operations and maintenance center (OMC) or a similar entity. The OMC or other such device would then download or program the information to the appropriate devices, such as BRs. At step 1003, the VRFD 401 determines if it will be transmitting (TX) or receiving (RX). If the VRFD 401 will be receiving, the process continues with step 1005, where the VRFD 401 receives a signal within the composite frequency range. At step 1007, the VRFD 401 then demodulates the received signal using a single demodulation path, as previously described, by demodulating the signal beginning with the first or lowest frequency and ending with the last or highest frequency in the composite frequency range. The process then continues with step 1013.

If at step 1003, the VRFD will be transmitting, the process continues with step 1009, where the VRFD 401 modulates the signal it intends to transmit. In the preferred embodiment, the signal is modulated by using a single modulation path, beginning with the first or lowest frequency and ending with the last or highest frequency of the composite frequency range. The modulated signal is then transmitted within the composite frequency range at step 1011, and the process continues with step 1013. At step 1013 it is determined if a new list of adjacent communication resources is being received or if the VRFD 401 should continue transmitting and receiving using its current list of adjacent communication resources, i.e., its present composite frequency range. If no new list is forthcoming, the process continues with step 1003, but if a new list is forthcoming, the process continues with step 1001, where a new list of adjacent communication resources is received, and the process continues such that the VRFD 401 then can receive or transmit signals substantially within the new composite frequency range, by demodulating or modulating signals beginning with the new first or lowest frequency and ending with the new last or highest frequency of the new composite frequency range. It is possible to allow the VRFD 401 to have a different composite frequency range for transmitting than for receiving. In the preferred embodiment, the communication resources are used as FDM or TDM communication resources. The VRFD may be utilized within a radio frequency communication system that comprises two or more different sets of contiguous frequency allocations, which sets are not adjacent. The VRFD 401 may then be programmed and reprogrammed to use any of the two or more sets of contiguous frequency allocations that may be allocated to the radio frequency communication system.

A method of allotting frequency allocations to frequency blocks is shown in flowchart of FIG. 11. At step 1101, frequency allocations to be allotted are identified. At step 1103, the frequency allocations are allotted to frequency blocks, which frequency blocks contain the composite frequency range for the frequency allocations identified at step 1101. At step 1105, a VRFD 401 is assigned to one or more frequency blocks. In the preferred embodiment, the VRFD 401 assigned at step 1105 is a BR. In addition, more than one BR may be assigned to a frequency block, for example, when frequency reuse patterns are implemented in a trunked or cellular communication system. At step 1107, a modulation scheme is selected, such as may be described with respect to FIG. 12, and the VRFD 401 communicates according (step 1109) to the frequency block and modulation scheme chosen at steps 1105 and 1107. At step 1111, if the frequency allocations are to be reassigned, the process continues with step 1101, otherwise the process continues with step 1111. The steps of the flow chart of FIG. 11 are performed by an OMC or similar device in the preferred embodiment. One or more frequency allocations may be allotted to a frequency block, in the situation where one frequency allocation is allocated, a conventional radio may be used instead of the VRFD. If a reassignment of frequency allocations is to take place, any number of possibilities for reassigning the frequency allocations may occur. For example, an additional frequency allocation may be added to the present frequency block or composite frequency range, a frequency allocation may be removed from either end of the composite frequency range, the VRFDs, or BRs, may be reassigned to other frequency blocks, and further a message may be sent to a communication unit indicating what type of modulation scheme was selected at step 1107, By identifying and allotting frequency allocations In this manner, it is possible for a communication system to have two or more BRs at a single site allotted to a different number of frequency allocations, in other words the BRs at a site may have different bandwidths over which to operate. In addition, these BRs may be a combination of TDM and FDM BRs.

A method of selecting and programming a modulation scheme in a VRFD is shown in the flowchart of FIG. 12. At stop 1201, it is determined what type of modulation scheme or technique is desired. If a TDM modulation scheme is desired, the process continues with step 1203, where the VRFD 401 is programmed to transmit and or receive signals in two or more frequency allocations utilizing a TDM technique. In other words, each signal occupies two or more frequency allocations, but for a shorter period of time, such as shown in FIG. 5. If at step 1201 an FDM type of modulation scheme is desired, the VRFD is programmed (step 1205) to transmit and/or receive a different signal in each of the different frequency allocations within the VRFD 401 composite frequency range, such as shown with respect to the example of FIG. 6. If at step 1201 a different type of modulation scheme, such as CDMA is desired, the VRFD 401 is programmed according to that modulation scheme at step 1207, and the process ends.

The present invention provides a method and apparatus for a single radio frequency device, such as a BR, to simultaneously transmit and/or receive multiple different communication resources, sourced or received by different devices. A single modulator or demodulator can accommodate transceiving wideband and narrowband signals without the addition of extra hardware. The present invention need not be restricted to only combining signals sourced or received by a single device. The radio may be programmed on-the-fly, and the frequency division or time division nature of the particular radio may change over time. System design requires many fewer BRs at each site, and fault tolerance is not such a cost concern as it has been in the past. A spare or back-up communication resource may simply be a programmed additional frequency allocation in a piece of hardware already at hand, with little added expense. The present invention provides for opportunistic use of the occurrence of adjacent channels in a system to enable the use of lower cost and complexity FDM multi-carrier or TDM transceivers. In a cellular system employing multiple-carrier cell site transceivers, the number of carriers provided by a radio frequency device may be adjusted or varied, for example, based on the number of adjacent fixed frequency cells assigned/licensed and selected for use at the cell site. Because a single transceiver is providing for adjacent channels from the same location, the dynamic range of signals between the channels may be constrained through the use of power control, having beneficial impact on the dynamic range requirements (e.g., number of bits) for the transceiver. The use of power control prevents the need to demodulate a large signal that is spectrally adjacent to a very small signal. Power control serves to make the received signals from all users approximately the same magnitude. Because the frequency allocations need not be adjacent to apply the teachings of the present invention, advantage may be gained in systems that do not have large consecutive frequency allocations available. In systems where a large amount of contiguous spectrum and multiple frequency allocations is available, a highly flexible system with a large number of communication resource options is provided from the application of the present invention.

Figure 13:
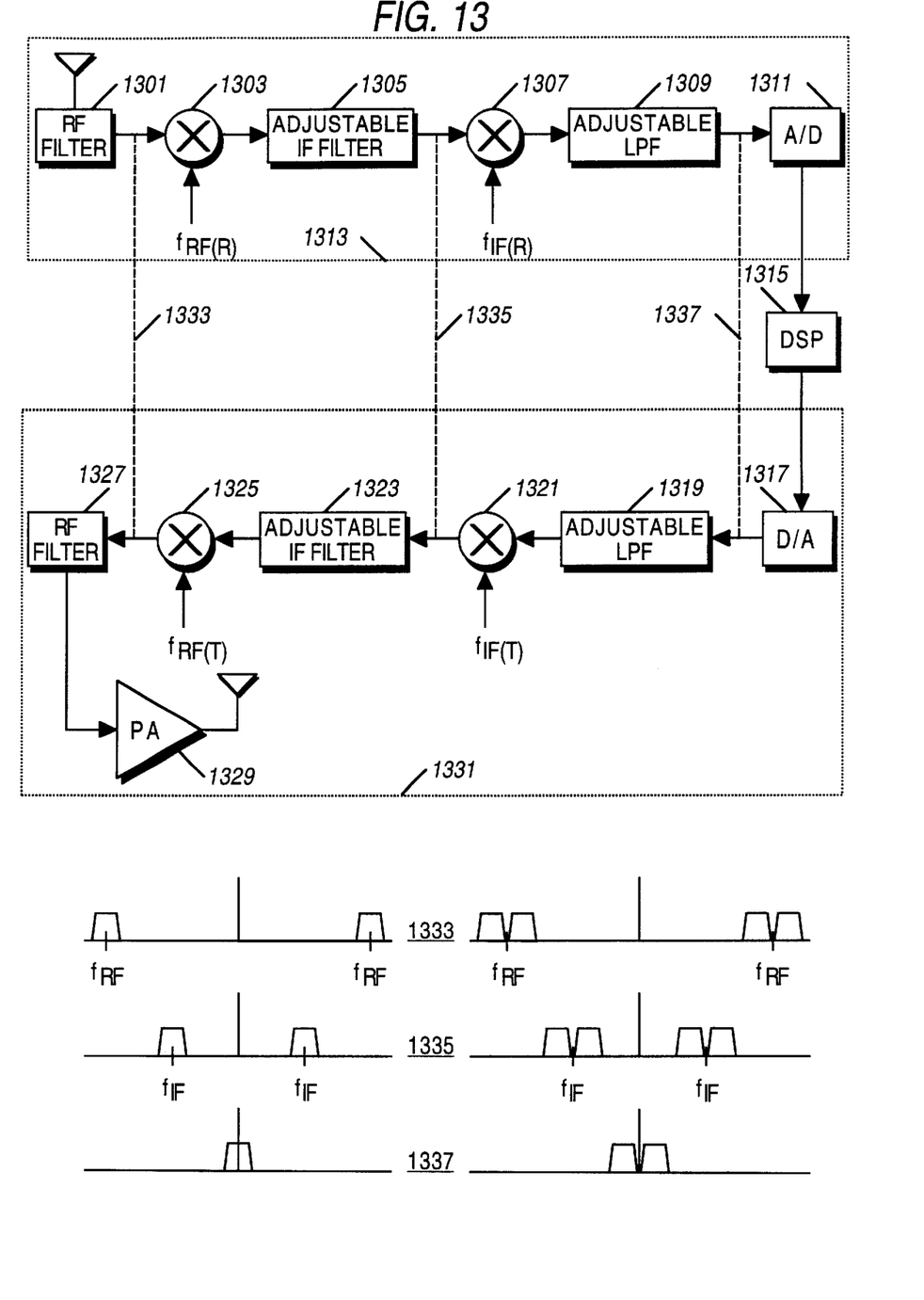
FIG. 13 is a block diagram of a radio frequency communication device in accordance with the invention.
Figure 15:
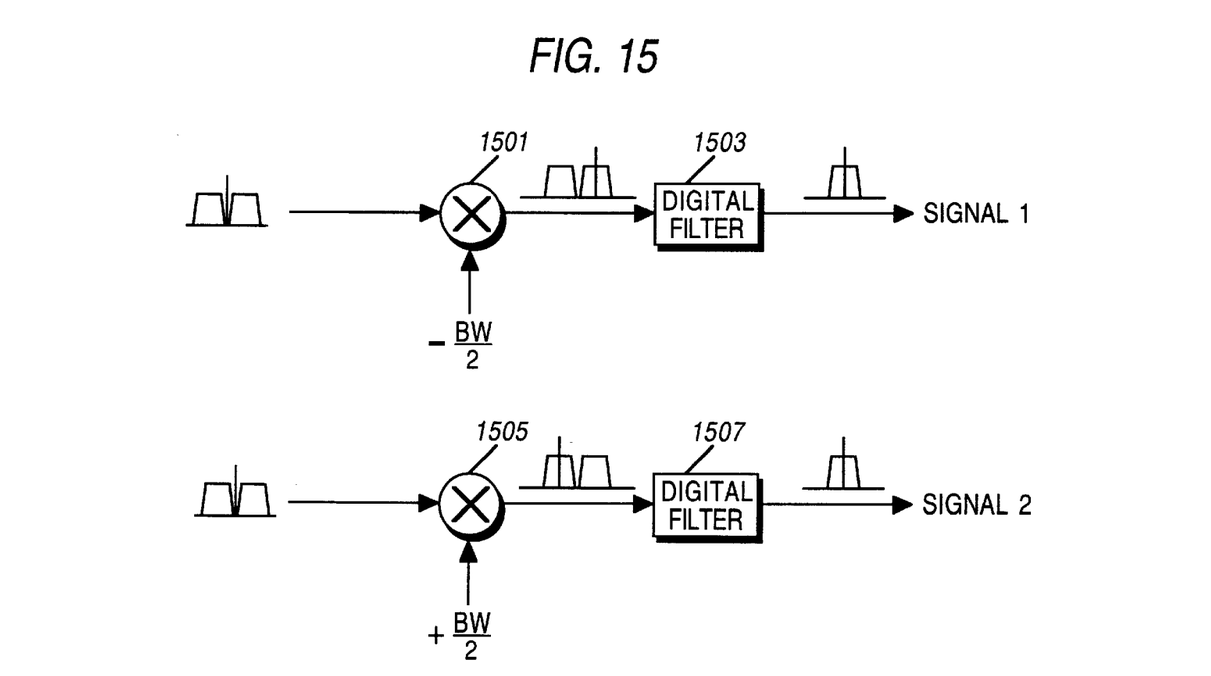
FIG. 15 is a block diagram of a radio frequency signal shifter for a receiver in accordance with the invention.

A radio frequency communication device, such as a base station, repeater, base radio, portable radio, mobile radio, cellular telephone, and so forth, is shown in the block diagram of FIG. 13. An RF filter 1301 receives an incoming signal via an antenna and forwards the signal after processing by crudely limiting the frequency spectrum to the entire allocated band and preventing undesired out of band signals from entering, and forwards the resultant signal to a mixer 1303. This mixer mixes the output signal from the RF filter 1301 with an output frequency $f_{RF}$, where the frequency $f_{RF}$ is the appropriate frequency needed to mix the received signal down to the intermediate frequency. The output signal of the mixer 1303 is input to an adjustable IF filter 1305. The adjustable IF filter has an adjustable bandwidth that is adjusted to the number of contiguous channels that this receiver 1313 is presently programmed to receive. For example, if this receiver 1313 is programmed to receive four contiguous channels, then the IF filter will be adjusted to filter the bandwidth of four contiguous channels. The IF filter performs the function of substantially eliminating anything other than the desired signals present in the contiguous allocation of frequencies. The output of the adjustable IF filter 1305 is input to a second mixer 1307, which mixes the intermediate frequency with the output of the adjustable IF filter 1305 and inputs it to an adjustable low pass filter 1309. The low pass filter is adjusted to the bandwidth of the resultant signal. The output of the adjustable LPF 1309 is input to an A/D (analog to digital) converter 1311, which outputs the converted analog input signal to a digital signal that is received by a DSP 1315 for further processing. The output signal from the A/D converter 1311 is a baseband signal containing one, two, or more signals. A diagram showing how the DSP 1315 recovers each of the individual signals from the A/D converter 1311 is shown in FIG. 15.

Figure 14:
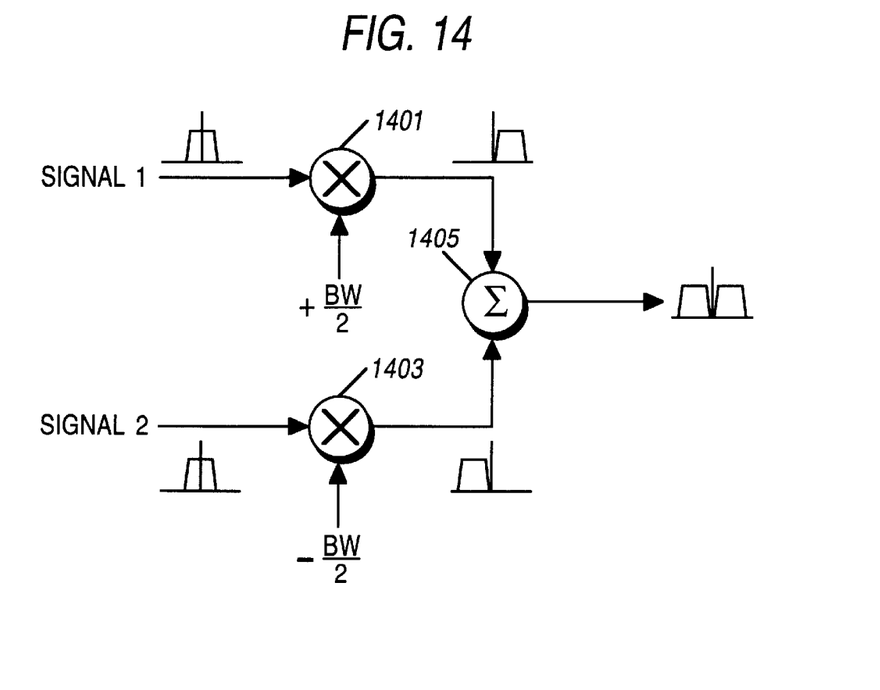
FIG. 14 is a block diagram of a radio frequency signal shifter for a transmitter in accordance with the invention.

In order to transmit a signal in accordance with the preferred embodiment, transmitter hardware may appear as shown in FIG. 13. The transmitter 1331 takes a digital signal from the DSP 1315 which is intended for transmission. This digital signal may comprise one or more signals intended for transmission on one or more contiguous frequency allocations. This signal may be composed and put together as shown in the diagram of FIG. 14. This digital signal is received by a D/A (digital to analog) converter 1317, which converts the digital signal to an analog signal that is input to an adjustable low pass filter 1319 that removes aliasing components and has a bandwidth equivalent to the total number of contiguous frequency allocations for which transmission is desired. The output signal from the adjustable LPF 1319 is input to a mixer 1321, which mixes that signal with a carrier signal at the frequency $f_{IF(T)}$ which is appropriate to mix the output of the adjustable LPF 1319 to the intermediate frequency of the transmitter of this radio. The resultant signal from the mixer 1321 is input to an adjustable filter 1323, that is adjusted to include the number of frequency allocations for which this transmission is desired, and filters its input to eliminate spurious frequencies. The output of the adjustable IF filter is input to a mixer 1325, which mixes the signal up to the RF frequency over which transmission is to take place. The output of the mixer 1325 is input to an RF filter 1327 that eliminates all the undesirable mixing and spurious noise components that may accompany the desired RF transmitted signal. The output of the RF filter 1327 is input to a power amplifier 1329 which outputs the signal to an antenna for transmission.

It is understood that many alternative ways of implementing the receiver and transmitter exist. For example, although the block diagram of FIG. 13 shows a radio frequency device having a single intermediate frequency, the invention may be successfully implemented in a multiple IF frequency environment as well. In an alternative implementation, the radio frequency device could employ a quadrature demodulator following the IF. This quadrature demodulator would employ the use of two mixers, driven with quadrature signals at the IF frequency, to produce two signals comprising the complex representation of the desired signal. The real and imaginary signals would be converted to digital using two A/D converters and these signals would be provided to the DSP for subsequent processing.

Frequency diagrams showing example signals at three different points 1333, 1335, and 1337 in both the transmitter and receiver are shown at the bottom of FIG. 13. At reference point 1333, signals are shown at the RF frequency. To the left of the reference point 1333, is the instance where a single frequency allocation is assigned for this particular application. To the right of the reference point is shown a dual signal, where two signals are intended to be transmitted over two frequency allocations, in an FDM type environment. In this instance, the two signals are symmetrical about the RF frequency $f_{RF}$. At reference point 1335, the single signal or double signal is shown to be centered about the intermediate frequency $f_{IF}$. At reference point 1337, the baseband signals are shown centered.

A block diagram of a radio frequency signal shifter/combiner for a transmitter is shown in FIG. 14. In the preferred embodiment, a digital transmitter is utilized. In the instance where only a single signal is to be transmitted over a single frequency allocation, there is no need to use the diagram of FIG. 14, as a conventional, single path transmitter, as is known in the art, will suffice. The diagram of FIG. 14 shows an example of how to provide a baseband signal that is to be transmitted across two frequency allocations. A first signal, Signal 1 is input in mixer 1401, which is mixed with a carrier signal at one-half the bandwidth of Signal 1 (+BW/2). The result is a signal that is shifted in frequency and input into a summer 1405. When a second signal, Signal 2, is also desired to be sent through a second frequency allocation, Signal 2 is input to a mixer 1403, where Signal 2 is mixed with a carrier signal at minus one-half the bandwidth of signal two (−BW/2). This slides this signal to the left, and the resultant signal is input to summer 1405. Summer 1405 then outputs both Signal 1 and Signal 2 as frequency shifted, resulting in a dual signal centered at the baseband. Should three signals be desired to be combined for transmission on three contiguous frequency allocations, then one of the signals, centered at the baseband, would be input to the summer in its present form, and the two frequency adjustments in the mixers 1401 and 1403 would be shifted by ±BW as appropriate. As another example, when four signals are desired to be transmitted on four contiguous frequency allocations, two additional mixer configurations would be summed into the summer 1405 in addition to those that are already shown. These two additional frequency configurations have frequency offsets of ±3BW/2, thereby resulting in four signals being centered at the baseband. This technique can be used for any number of signals to be transmitted in contiguous frequency allocations. The diagram of FIG. 14 is implemented in a DSP 1315 in the preferred embodiment.

A block diagram of a radio frequency signal shifter for a receiver is shown in FIG. 15. In the preferred embodiment, a digital receiver is utilized. Should only a single signal be received on a single frequency allocation, then there is no need to use the block diagrams of FIG. 15, as a conventional, single branch receiver, as is known in the art, will suffice. In the example where two signals are transmitted in FDM format over two contiguous frequency allocations, the input signal at the receiver, which is two signals centered at the baseband, is input into a mixer 1501, which shifts the signal by −BW/2, thereby shifting the right hand signal such that it is symmetrical about the baseband, and can be recovered by digital filter 1503, thereby resulting in Signal 1. The dual baseband signal is also input to another mixer 1505 that frequency shifts by +BW/B2, thereby shifting the left most signal to be symmetrical about the baseband. The resultant signal is then digitally filtered at digital filter 1507 to recover Signal 2, which is output at digital filter 1507. The operations and apparatus shown in FIG. 15 are performed by a DSP 1315 in the preferred embodiment. In this instance, the DSP is used to separate the signals before demodulating each signal independently. In the example where three signals are transmitted in FDM fashion on three contiguous frequency allocations, the center signal may be demodulated as is currently known in the art, and the signals are then adjusted in frequency at mixers 1501 and 1505 by a frequency ±BW, where BW represents the bandwidth of the signals. In the preferred embodiment, each of the signals is presumed to have the same bandwidth. In the example where four signals may be transmitted in FDM fashion on four contiguous frequency allocations, two additional mixer digital filter combinations are provided, in which case the mixers mix the baseband signal by ±3BW/2, in order to operate the additional two signals before demodulation. The same process may be applied to signals of five or more contiguous frequency allocations transmitted in FDM format.

The present invention provides instantaneous use of two or more adjacent frequency allocations. The frequency allocations are used to transmit and receive information to two or more users. (As is well known, but not shown, offset timing of the up- and down-link may be employed to avoid simultaneous transmission and reception of the subscriber unit.) These users might have legacy subscriber equipment that is not capable in operating in anything but the conventional single frequency time-slotting mode. Two or more independent signals provided in each of the two or more frequency allocations. In the downlink, the BR produces each of these signals. In the uplink, each of the subscriber units produces a single frequency in each allocation. During one time slot, the BR receiver simultaneously receives each frequency allocation and decode the information from each of the separate users. Also during the time slot, the BR transmitter simultaneously transmits each frequency allocation to each individual users. In a TDM environment, the BR receives from a single user a single signal simultaneously overlaying two or more frequency allocations. The BR transmitter transmits to that user with a similar signal. The present invention may be applied to simplex, half-duplex, and full-duplex communications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a radio frequency communication system having a predetermined number of communication resources and providing communications to a plurality of communication units, a method comprising the steps of:

receiving, by a radio frequency communication device, a list of two or more adjacent communication resources, wherein the two or more adjacent communication resources have a composite frequency range comprising the at least two or more adjacent communication resources and having a first frequency at the lowest frequency in the composite frequency range and a last frequency at the highest frequency in the composite frequency range;

modulating, using a single modulation path, a signal beginning with the first frequency and ending with the last frequency, yielding a radio frequency signal; and transmitting the radio frequency signal substantially within the composite frequency range.

2. The method of claim 1, further comprising the steps of:

receiving, by a radio frequency communication device, a list of at least two adjacent communication resources, wherein the list of at least two adjacent communication resources has a new composite frequency range comprising the at least two adjacent communication resources and having a new first frequency at the lowest frequency in the new composite frequency range and a new last frequency at the highest frequency in the new composite frequency range;

modulating, using the single modulation path, a new signal beginning with the new first frequency and ending with the new last frequency, yielding a new radio frequency signal; and transmitting the new radio frequency signal substantially within the new composite frequency range.

3. The method of claim 1, wherein the radio frequency signal is comprised of a first signal and a second signal, and wherein the first signal is received by a first receiver and the second signal is received by a second receiver, and wherein the first receiver is not the second receiver.

4. The method of claim 1, wherein the radio frequency communication system comprises a first set of contiguous frequency allocations and a second set of contiguous frequency allocations, wherein the first set and the second set are not adjacent.

5. The method of claim 1, wherein a modulator uses frequency division multiplexing.

6. The method of claim 1, wherein a modulator uses time division multiplexing.

7. In a radio frequency communication system having a predetermined number of communication resources and providing communications to a plurality of communication units, a method comprising the steps of:

receiving, by a radio frequency communication device, a list of two or more adjacent communication resources, wherein the two or more adjacent communication resources have a composite frequency range comprising the at least two or more adjacent communication resources and having a first frequency at the lowest frequency in the composite frequency range and a last frequency at the highest frequency in the composite frequency range;

receiving a radio frequency signal substantially within the composite frequency range; and demodulating, using a single demodulation path, the received radio frequency signal beginning with the first frequency and ending with the last frequency.

8. The method of claim 7, further comprising the steps of:

receiving, by a radio frequency communication device, a list of at least two adjacent communication resources, wherein the list of at least two adjacent communication resources has a new composite frequency range comprising the at least two adjacent communication resources and having a new first frequency at the lowest frequency in the new composite frequency range and a new last frequency at the highest frequency in the new composite frequency range;

receiving a new radio frequency signal substantially within the new composite frequency range; and demodulating, using the single demodulation path, the new received radio frequency signal beginning with the new first frequency and ending with the new last frequency.

9. The method of claim 7, wherein the radio frequency signal is comprised of a first signal and a second signal, and wherein the first signal is sourced by a first transmitter and the second signal is sourced by a second transmitter, and wherein the first transmitter is not the second transmitter.

10. The method of claim 7, wherein the radio frequency communication system comprises a first set of contiguous frequency allocations and a second set of contiguous frequency allocations, wherein the first set and the second set are not adjacent.

11. The method of claim 7, wherein a demodulator uses frequency division multiplexing.

12. The method of claim 7, wherein a demodulator uses time division multiplexing.

13. A method comprising the steps of:
identifying a first frequency allocation and a second frequency allocation;
determining whether a first signal is to occupy the first frequency allocation and a second signal is to occupy the second frequency allocation or a third signal is to occupy both the first frequency allocation and the second frequency allocation;
when the first signal is to occupy the first frequency allocation and the second signal is to occupy the second frequency allocation, programming a radio frequency device to at least one of receive and transmit the first signal within the first frequency allocation and the second signal within the second frequency allocation.

14. The method of claim 13, further comprising the steps of:
identifying a third frequency allocation;
programming the radio frequency device to at least one of:
a) simultaneously receive the first signal within the first frequency allocation, the second signal within the second frequency allocation, and a fourth signal within the third frequency allocation; and
b) simultaneously transmit the first signal within the first frequency allocation, the second signal within the second frequency allocation, and a fourth signal within the third frequency allocation.

15. The method of claim 13, further comprising the step of when the third signal is to occupy both the first frequency allocation and the second frequency allocation, programming the radio frequency device to at least one of receive and transmit the third signal simultaneously occupying both the first frequency allocation and the second frequency allocation.

16. The method of claim 15, further comprising the steps of:
identifying a third frequency allocation;
programming the radio frequency device to at least one of receive and transmit a fourth signal simultaneously occupying the first frequency allocation, the second frequency allocation, and the third frequency allocation.

17. A radio frequency device comprising:
a transmitter;
a modulator disposed within the transmitter, the modulator arranged and constructed to transmit, using a single modulation path, a communication signal modulated within N adjacent frequency allocations, wherein N is an integer greater than or equal to two; and
a microprocessor, operably coupled to the transmitter, arranged to receive a list of N adjacent frequency allocations and to instruct the transmitter to modulate the communication signal according to the list.

18. The radio frequency device of claim 17, wherein the modulator has at least two modes of operation, wherein:
i) in a first mode of operation, the modulator transmits N signals, wherein each of the N signals occupies a different one of N adjacent frequency allocations from among K contiguous frequency allocations; and
ii) in a second mode of operation, the modulator modulates a signal occupying a time slot of length X and M adjacent frequency allocations from among L contiguous frequency allocations;
wherein X is a time period and K, L, and M are each an integer greater than or equal to two.

19. The radio frequency device of claim 17, wherein the transmitter is used in a communication system comprising K contiguous frequency allocations, wherein K is an integer greater than or equal to two, wherein N is less than or equal to K, and the N adjacent frequency allocations comprises any N adjacent frequency allocations of the K contiguous frequency allocations.

20. The radio frequency device of claim 17, wherein the transmitter is used in a communication system comprising K contiguous frequency allocations and the communication signal occupies a time slot of length X, wherein K is an integer greater than or equal to two and X is a time period.

21. The radio frequency device of claim 17, wherein the transmitter is used in a communication system comprising a first set of contiguous frequency allocations and a second set of contiguous frequency allocations, wherein the first set and the second set are not adjacent.

22. The radio frequency device of claim 17, wherein the communication signal is comprised of at least two time division multiplexed signals.

23. The radio frequency device of claim 17, wherein the communication signal is comprised of N signals each occupying a time slot of length X.

24. A radio frequency device comprising:
a receiver;
a demodulator disposed within the receiver, the demodulator arranged and constructed to receive, using a single demodulation path, a communication signal modulated within N adjacent frequency allocations, wherein N is an integer greater than or equal to two; and
a microprocessor, operably coupled to the receiver, arranged to receive a list of N adjacent frequency allocations and to instruct the receiver to demodulate the communication signal according to the list.

25. The radio frequency device of claim 24, wherein the demodulator has at least two modes of operation, wherein:
i) in a first mode of operation, the demodulator demodulates N signals, wherein each of the N signals occupies a different one of N adjacent frequency allocations from among K contiguous frequency allocations; and
ii) in a second mode of operation, the demodulator demodulates a signal occupying a time slot of length X and M adjacent frequency allocations from among L contiguous frequency allocations;
wherein X is a time period and K, L, and M are each an integer greater than or equal to two.

26. The radio frequency device of claim 24 wherein the receiver is used in a communication system comprising K contiguous frequency allocations, wherein K is an integer greater than or equal to two, wherein N is less than or equal to K, and the N adjacent frequency allocations comprises any N adjacent frequency allocations of the K contiguous frequency allocations.

27. The radio frequency device of claim 24, wherein the receiver is used in a communication system comprising K contiguous frequency allocations and the communication signal occupies a time slot of length X, wherein K is an integer greater than or equal to two and X is a time period.

28. The radio frequency device of claim 24, wherein the receiver is used in a communication system comprising a first set of contiguous frequency allocations and a second set of contiguous frequency allocations, wherein the first set and the second set are not adjacent.

29. The radio frequency device of claim 24, wherein the communication signal is comprised of a first signal and a second signal, wherein the first signal is sourced by a first transmitter and the second signal is sourced by a second transmitter, and wherein the first transmitter is not the second transmitter.

30. The radio frequency device of claim 24, wherein the communication signal is comprised of at least two time division multiplexed signals.

31. A method comprising the steps of:
   identifying a plurality of frequency allocations;
   allotting two or more of the plurality of frequency allocations to each of one or more frequency blocks, such that each of the one or more frequency blocks is comprised of two or more adjacent frequency allocations,
   assigning at least one base radio to each of the one or more frequency blocks;
   selecting a modulation scheme for use by the at least one assigned base radios.

32. The method of claim 31, wherein the step of selecting comprises the step of selecting a time division multiplexed modulation scheme for a first base radio, the method further comprising the step of sending a message, to a radio frequency communication unit, the message indicating that the time division multiplexed modulation scheme is assigned to the frequency block assigned to the first base radio.

33. The method of claim 31, further comprising the step of adding one of the plurality of frequency allocations to a first frequency block of the one or more frequency blocks, wherein the added one of the plurality of frequency allocations is adjacent to one of the two or more of the plurality of frequency allocations allotted to the first frequency block.

34. The method of claim 31, further comprising the step of removing one of the plurality of frequency allocations from a first frequency block of the one or more frequency blocks, wherein the remaining frequency allocations allotted to the first frequency block are adjacent.

35. The method of claim 31, further comprising the steps of reassigning at least one base radio to one of the one or more frequency blocks.

36. The method of claim 31, wherein a different number of frequency allocations is assigned to two or more base radios.

* * * * *